United States Patent [19]

Weber

[11] Patent Number: 4,738,541

[45] Date of Patent: Apr. 19, 1988

[54] APPARATUS FOR MIXING FLUIDS

[76] Inventor: Klaus Weber, Philipp-Reis-Strasse 5, D-3200 Hildesheim, Fed. Rep. of Germany

[21] Appl. No.: 920,144

[22] Filed: Oct. 16, 1986

[51] Int. Cl.4 ........................ B01F 15/04; G05D 11/02

[52] U.S. Cl. ................................ 366/152; 137/101.11; 137/101.19; 137/895; 366/163

[58] Field of Search ............... 366/150, 152, 160, 161, 366/162, 163, 153, 164, 165; 137/101.11, 101.19, 895

[56] References Cited

U.S. PATENT DOCUMENTS

| | | | |
|---|---|---|---|
| 3,782,695 | 1/1974 | Sandlford | 366/163 |
| 4,196,748 | 4/1980 | Gillespie | 137/895 |
| 4,202,760 | 5/1980 | Storey | 137/101.11 |
| 4,436,113 | 3/1984 | Finger | 137/895 |

*Primary Examiner*—Robert W. Jenkins

*Attorney, Agent, or Firm*—Allegretti, Newitt, Witcoff & McAndrews, Ltd.

[57] ABSTRACT

An apparatus for mixing fluids in accurate predetermined quantities has a feed line for a first fluid (water) under pressure, a suction line for a second fluid (disinfectant) which is to be mixed to the first fluid, and an injector in the form of a fluid jet pump, to which, on the intake side, the feed line is connected. A magnetic valve is positioned in the first fluid feed line. To maintain a precise dosing and to prevent a backflow of the mixture, the feed line is connected to a pressure equalizing container, the fluid level of which is regulated by a fluid pressure switch which controls the magnetic valve. An outlet line from the pressure equalizing container communicates with the inlet of the injector through an air gap.

15 Claims, 3 Drawing Sheets

APPARATUS FOR MIXING FLUIDS

The invention concerns an apparatus for mixing fluids in accurately predetermined quantities, as for example, in admixing a disinfectant agent to water to make a solution of desired strength.

PRIOR ART

A device for mixing water and disinfecting agent concentrate is disclosed in German specification No. 34 00 263. The water flows from the water system through a pipe, through an electrical water volume safety device, a removal valve, and an electrically-operable magnetic valve, as well as a pipe ventilator containing a flow quantity regulator, to an injector dosing head. The dosing head takes the form of a water jet pump which, by means of a suction line, pumps disinfectant agent concentrate out of a cannister, and adds it to the flowing water. A sensor monitors the conductivity and temperature of the disinfectant solution produced. A control device senses the various flow rates and compares them with the desired values. Upon deviation from the desired value, the magnetic valve is actuated to block the water feed to the water jet pump, and simultaneously stops the feeding of the solvent concentrate. This apparatus is disadvantageous in that the dosing depends directly on the water pressure. Since an accurate dosing can be attained only with constant water pressure, the known device operates imprecisely during swings in pressure. There exists the danger that the conductivity measured will thereby deviate too greatly from the desired value, which has as a consequence the obligatory switching off of the device by means of the magnetic valve. It is furthermore disadvantageous in that a separation between the water supply system and the disinfectant agent concentrate or disinfectant agent solution is not ensured, since the valves used offer no satisfactory security against a backflow of disinfectant agent solution, and thus against contamination of the feed water.

THE INVENTION

The object of the present invention is to provide a dosing device in which the dosing precision remains constant, even under fluid pressure oscillations and in which a backflow is positively prevented.

By means of the construction in accordance with the invention, a uniform fluid pressure to the injector is adjusted, independently of the pressure of the feed fluid, whereby a uniform dosing can be attained for each adjustable mixing ratio of the fluids. By providing an air gap in the feed line, an absolute separation between the fluids to be mixed, and in particular between the fluids conducted under pressure to the injector, can be attained, thereby avoiding contamination of the fluid conducted under pressure. For the production of disinfectant solutions prepared from water fed from a water supply, and from a disinfectant agent concentrate, this means that the danger of contamination of the water system from which the feed water is supplied is positively prevented by preventing the backflow of the disinfectant agent solution.

THE DRAWINGS

These and other advantages of the invention will be illustrated in the appended drawings, in which FIG. 1 is a diagramatic sectional view showing a first form apparatus constructed in accordance with the invention.

DETAILED DESCRIPTION

Figure 1:
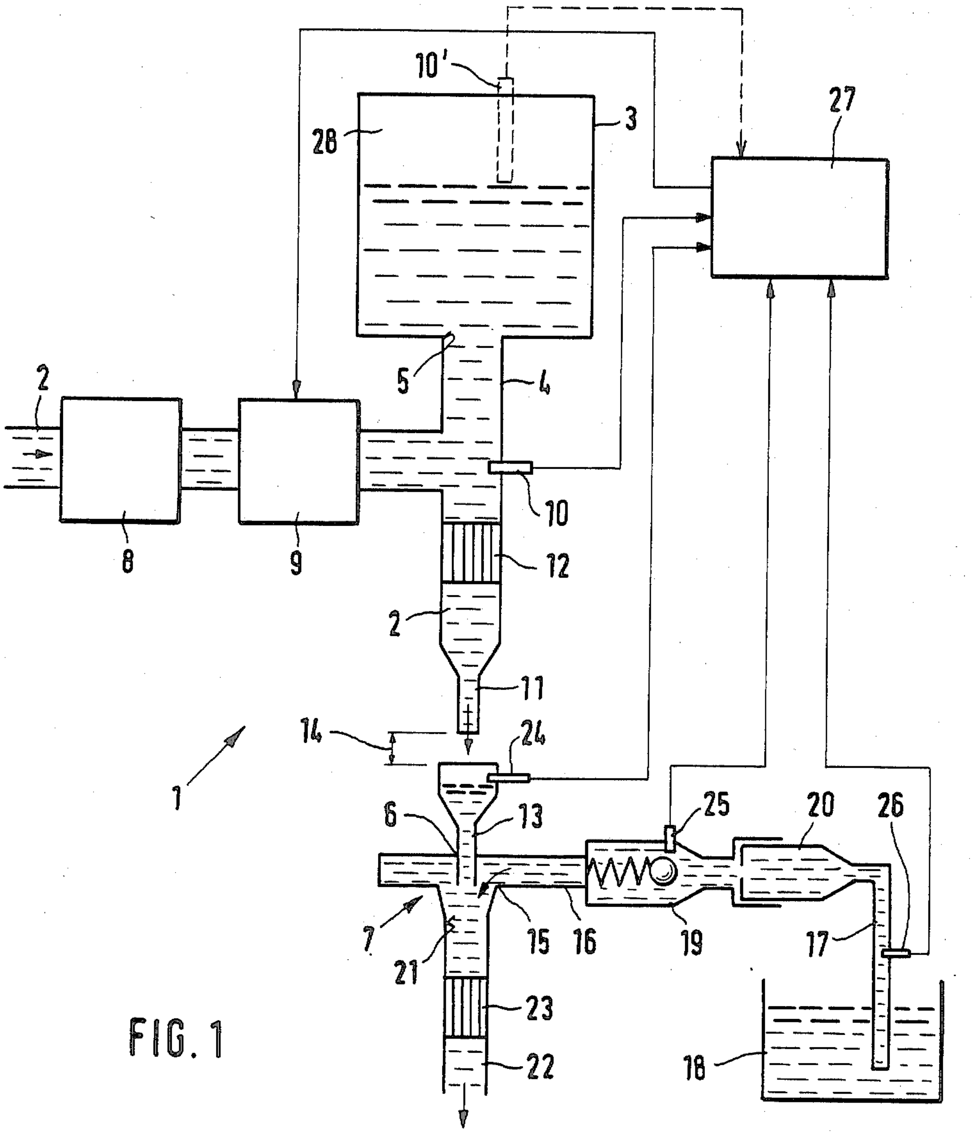

FIG. 1 shows an apparatus 1 for mixing fluids having a feed line 2, through which the water under pressure is conducted from the water system. The feed line 2 leads to a pressure equalizing container 3 having an outlet line 4 which connects the opening 5 in the bottom of the pressure equalizing container 3. Line 4 connects with inlet 6 of an injector indicated generally at 7.

A pressure reducing means 8, as well as a magnetic valve 9, are positioned in the water feed line 2. A pressure switch 10 is connected to the outlet 4 to sense the pressure therein. The end of the outlet line 4 takes the form of a nozzle 11. A jet regulator 12 is positioned ahead of the nozzle in the outlet line.

The injector 7 comprises a water jet pump. The inlet 6 of the injector 7, terminates in a nozzle 13. In FIG. 1 the nozzles 11 and 13 are not connected directly to one another, but an air gap 14 of approximately 20 mm is positioned between them.

The injector 7 has a venturi-like suction device 15, to which a suction line 16 is connected. Line 16 is fed from a suction lance unit 17 which projects into a storage container 18, containing a second fluid, such as, for example, a disinfectant agent concentrate to be mixed with the fluid under pressure. A backflow-impeding unit 19 and a nozzle 20 are positioned within the suction line 16. The outlet 21 of the injector 7 connects to outlet line 22 in which a jet regulator 23 is positioned.

A sensor 24 for fluid levels monitoring is connected to the nozzle 13 and serves through a control device to prevent the overflow of the nozzle 13. A sensor 25 is provided for the flow control of the fluid from the storage container 18 which sensor carries out the measurement of conductivity values. A measuring probe 26 for fill level control is connected to the suction lance unit 17. The output signals of the pressure switch 10, the level monitor sensor 24, the flow control sensor 25, and the fill level measuring probe 26 connect to an electrical control device 27 for processing and issuance of control signals.

The apparatus operates as follows: The fluid running through the feed line 2, which is under pressure, flows into the pressure equalizing container 3, after passing through the pressure reducing means 8 and the magnetic valve 9. When filling the pressure equalizing container, the air column 28 above the liquid level in the pressure equalizing container is compressed until a fluid pressure is attained, which is then read by the pressure switch 10. The output signals of switch 10 are evaluated in the control device 27 which, upon reaching a preset pressure, prompts the magnetic valve 9 to close. In this manner, the fluid pressure of the fluid conducted to the injector 7 can be regulated. The pressure oscillates very slightly around an average predetermined value.

The fluid discharged from the pressure equalizing container leaves the nozzle 11 at a constant rate under pressure of the fluid head as a fluid jet. After flowing through the air gap 14, the liquid is discharged into the nozzle 13 of the inlet 6 of the injector 7. A constant negative pressure is produced in the injector by the fluid jet leavng the nozzle 13, whereby the fluid to be added is sucked out of the supply container 18 and through the suction line 16. This fluid is mixed in the injector 7 with the fluid from the pressure equalizing container, and the mixture flows out of the outlet line 22. The quantity of the fluid sucked out of the supply container 18 is determined by the adjustment of the nozzle 20 in the suction line, and by the pressure constantly maintained in the pressure equalizing container. Thus, the mixing ratio is determined by the nozzle 20 and the pressure in the pressure equalizing container.

Figure 2:
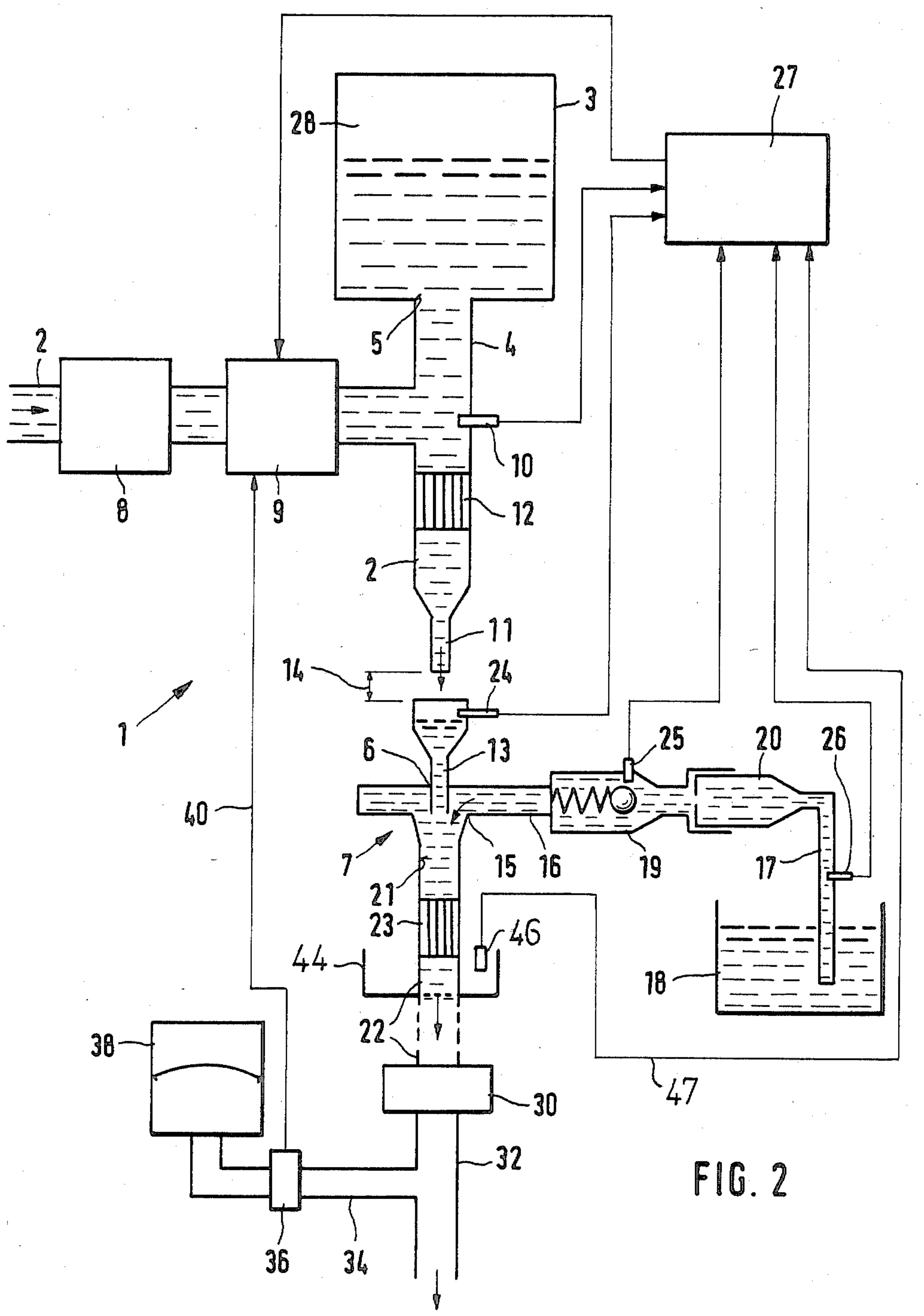
FIG. 2 is a similar view of a second form of apparatus constructed in accordance with the invention.

FIG. 2 shows a modified form of execution, which essentially operates like the apparatus of FIG. 1. The device depicted in FIG. 2 differs from that in FIG. 1 in that measurements are undertaken on the consumption side in order to make a connection for plug-in receptacles (in hospitals, for example), foot showers, spraying devices, jet spraying tubelets, and the like to which the mixture is supplied. A check valve 30 is positioned in the outlet line 22 to which, on the output side, a line 32 can be connected with a consumption unit. Line 32 is connected to a pressure equalizing container 38 by means of a branch line 34. In that line 34, there is positioned a pressure switch 36 through which the feed line 2 can be closed in dependence upon the output pressure in line 32 which can be regulated through corresponding control of the magnet valve 9 through a line 40, as is shown in FIG. 2. The pressure reservoir 38 is acted upon by compressed air.

The pressure switch 36 closes the magnetic valve 9 at a preset output pressure (such as 2 bar, for example), so that a further flow into the outlet line is blocked, until the initial pressure falls further below the threshold value (here, 2 bar, for example). Through the blocking of the feed line 2 by means of the magnetic valve 9, a pressure difference arises in the lines 22 and 32 to close the check valve 30. If the initial pressure subsequently falls below the threshold value, the pressure difference also disappears. The magnetic valve then releases the feed line again, and the check valve goes to the open position.

Under some circumstances, dripping water can overflow at the air gap 14, in the apparatus of FIG. 2. In order to collect this dripping water, a collecting container 44 is provided, the fluid quantity in which can be read with the help of a fluid level sensor 46. This sensor 46 is preferably connected with the control device 27 through line 47 in order to signal a maximum fluid level.

Figure 3:
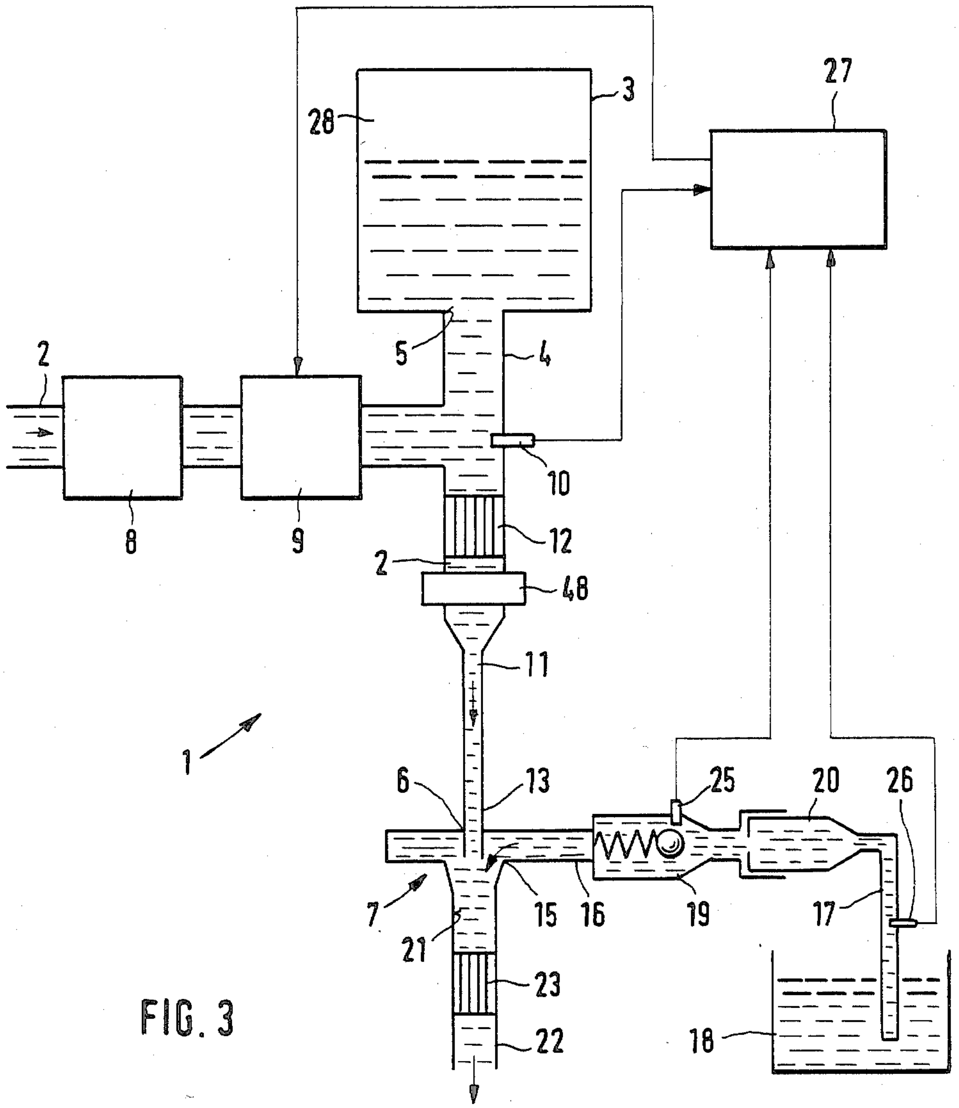
FIG. 3 is a similar view of a simplified form of the apparatus constructed in accordance with the invention.

FIG. 3 shows a simplified form of execution of the apparatus of FIGS. 1 or 2. In omitting the air gap 14, the feed line 2 is directly connected with the input branch 6 of the injector 7. To improve the current behavior, a ventilator valve 48 is positioned in the feed line 2 or the outlet line 4. In connection with the description of FIG. 1 given above, the fluid pressure in the outlet line 4 is read with the help of a pressure switch 10. Instead of pressure switch 10, a fluid level sensor (10') is provided, which directly reads the fluid level in the pressure equalizing container 3. The measuring signals are conducted to the control device 27 for evaluation, as indicated in FIG. 1 by the dotted lines.

What is claimed is:

1. In an apparatus for accurately mixing fluids comprising:

a feed line for a first fluid under pressure, a magnetic valve in said feed line, a suction line for a second fluid to be mixed with the first fluid, said suction line connecting to a storage container for said second fluid, a jet pump injector having an inlet and an outlet, said feed line feeding first fluid to said inlet and said suction line feeding second fluid to said outlet, the improvement comprising:

a pressure equalizing container connected to said feed line, a fluid level measuring device disposed in said container for controlling said magnetic valve, and an air gap in said feed line between said equalizing container and said injector inlet.

2. The apparatus of claim 1 in which said feed line immediately above said air gap terminates in a first nozzle and a second nozzle immediately below said air gap connects to said injector inlet.

3. The apparatus of claim 2 which includes a sensor in said second nozzle for monitoring the fluid level therein.

4. The apparatus of claim 3 in which said fluid level measuring device is a fluid pressure switch and includes an electrical control device, said fluid pressure switch and said sensor producing signals which are fed to said control device for controlling said magnetic valve.

5. The apparatus of claim 2 in which the distance between said first and second nozzles is approximately 20 mm.

6. The apparatus of claim 2 which includes a mixture outlet downstream of said injector outlet, a check valve in said mixture outlet, a second pressure equalizing container, a pipe connecting said second equalizing container to said mixture outlet and a pressure switch in said pipe for controlling said magnetic valve in response to the pressure in said pipe.

7. The apparatus of claim 6 in which said second pressure equalizing container connects to a source of compressed air.

8. The apparatus of claim 2 which includes a collecting container beneath said second nozzle for catching dripping fluids which accumulate above said air gap.

9. The apparatus of claim 1 in which said fluid level measuring device is a fluid pressure switch or a fluid level switch.

10. The apparatus of claim 9 in which said fluid pressure switch is positioned in the feed line above said air gap.

11. The apparatus of claim 1 which includes a presettable pressure reducing means in the feed line upstream of said magnetic valve.

12. The apparatus of claim 1 in which said feed line includes a branch comprising an outlet from said pressure equalizing container.

13. The apparatus of claim 12 which includes a first jet regulator in said feed line branch and a second jet regulator in said injector outlet.

14. The apparatus of claim 12 in which said feed line connects to said branch just downstream of said magnetic valve.

15. An apparatus for accurately mixing fluids comprising:

a feed line for a first fluid under pressure, a magnetic valve in said feed line, a suction line for a second fluid to be mixed with the first fluid, said suction line connecting to a storage container for said second fluid, a jet pump injector having an inlet and an outlet, said feed line connecting directly to said inlet, the improvement comprising:

a pressure equalizing container connected to said feed line, and a ventilating valve in said feed line upstream of the point where said feed line connects to said jet pump inlet.

* * * * *